(12) United States Patent
Turner, Jr.

(10) Patent No.: US 8,100,100 B2
(45) Date of Patent: Jan. 24, 2012

(54) VALVE COVER HOUSING FOR INTERNAL COMBUSTION ENGINES

(76) Inventor: Price George Turner, Jr., Clayton, NY (US)

( * ) Notice: Subject to any disclaimer, the term of this patent is extended or adjusted under 35 U.S.C. 154(b) by 349 days.

(21) Appl. No.: 12/539,865

(22) Filed: Aug. 12, 2009

(65) Prior Publication Data

US 2010/0043740 A1   Feb. 25, 2010

Related U.S. Application Data

(60) Provisional application No. 61/090,061, filed on Aug. 19, 2008.

(51) Int. Cl.
*F01M 9/10* (2006.01)
(52) U.S. Cl. ............... 123/90.38; 123/90.33; 123/193.5; 123/195 C
(58) Field of Classification Search ............... 123/90.33, 123/90.38, 193.3, 193.5, 195 C, 198 E
See application file for complete search history.

(56) References Cited

U.S. PATENT DOCUMENTS

| | | |
|---|---|---|
| 3,456,759 A | 7/1969 | Henry-Biabaud |
| 3,554,171 A | 1/1971 | Herschmann et al. |
| 4,131,093 A | 12/1978 | Mansfield |
| 4,593,661 A | 6/1986 | Brander |
| 4,708,095 A | 11/1987 | Luterek |
| 5,285,754 A | 2/1994 | Bell |
| 5,513,604 A | 5/1996 | Clement |
| 5,931,131 A | 8/1999 | Hackett |
| 6,880,506 B2 * | 4/2005 | Gschwindt et al. ........ 123/90.38 |
| 7,316,215 B1 | 1/2008 | Nino et al. |
| 2008/0072856 A1 | 3/2008 | Platt |

OTHER PUBLICATIONS

Notification of Transmittal of the International Search Report and the Written Opinion of the International Searching Authority, or the Declaration, May 14, 2010, 4 pages.
International Search Report, May 14, 2010, 3 pages.
Written Opinion of the International Searching Authority, May 14, 2010, 5 pages.
Monroe, Tom; The Racing Engine Builder's Handbook; 2006; 3 pgs.; HP Books, Penguin Group (USA) Inc.; New York; USA.
Turner, Jr., Price George; Declaration; Jul. 15, 2009.

* cited by examiner

*Primary Examiner* — Ching Chang (57) ABSTRACT

A valve cover housing for internal combustion engines. In one embodiment, the valve cover housing includes a conduit for passing a coolant fluid near the valvetrain, and in another embodiment, the housing includes an internal protuberance or other structure that promotes the dripping of oil or another lubricant onto a selected region or component of the valvetrain, such as the valve springs.

26 Claims, 9 Drawing Sheets

*Fig. 1*

(Prior Art)

VALVE COVER HOUSING FOR INTERNAL COMBUSTION ENGINES

CROSS-REFERENCE TO RELATED PATENT APPLICATIONS

The instant patent application claims priority to Provisional Patent Application Ser. No. 61/090,061, filed Aug. 19, 2008 and entitled "Valve Cover Housing For Internal Combustion Engines". Applicant incorporates herein by reference the subject matter of that provisional patent application.

FIELD OF THE INVENTION

The present invention relates to valve cover housings for internal combustion engines such as those fueled by gasoline, diesel, propane, methanol, and nitromethane.

BACKGROUND OF THE INVENTION

Internal combustion engines are conventionally powered by the introduction of a fuel, such as gasoline or diesel, and air into a combustion chamber. Typically, the combustion chamber is fashioned as a cylinder in which a piston is slidably confined. A spark ignites the fuel and air mixture, causing an explosion. The expanding gases resulting from the explosion act on and forcefully move the piston in the cylinder. The piston is connected through a connecting rod to a rotatable crankshaft, which may be connected to wheels and other devices to perform useful work.

Valves are used to control the injection of air and fuel into the combustion chamber and to allow the ignited, expanded gas to exit the combustion chamber. The timing for opening and closing the valves is controlled by a camshaft, which in turn is synchronized to the crankshaft by a chain, belt, or gear.

A valvetrain typically includes the valves, valve springs (such as metal coil springs) that bias the valve into a closed position, rocker arms that act upon the valves to move the valves against the valve spring bias and to open the valves, push rods that actuate the rocker arms, and lifters that ride on the camshaft and act on the ends of the push rods.

The valvetrain components, especially metal valve springs, usually become very hot. Because the valve springs often cycle through compression and extension many hundreds, if not thousands, of times per second during the operation of an internal combustion engine, the metal in the valve springs becomes hot due to the flexion of the metal. The exhaust valve springs are especially prone to becoming very hot because the exhaust valve opens near the end of the combustion cycle, while there is still some combustion pressure in the combustion chamber, and the hot combustion gases exit the combustion chamber, around the valve head and valve stem, and pass through the exhaust port. Heat travels up the valve stem and is transferred to the exhaust valve spring.

Although spraying oil or another lubricant onto the springs has been used in an attempt to cool the valve springs, the temperature of the oil, particularly oil used in an engine under load, can reach three hundred degrees or more, which results in an ineffective attempt to cool the valve springs with hot oil.

Reducing the temperature of the valvetrain components, such as valve springs, will increase valvetrain longevity, decrease the chance of engine-damaging detonation, and increase operating efficiency of the engine.

SUMMARY OF THE INVENTION

The invention relates to a valve cover housing for internal combustion engines. In one embodiment, the valve cover housing includes a conduit for passing a coolant fluid near the valvetrain, and in another embodiment, the housing includes an internal protuberance or other structure that promotes the dripping of oil or another lubricant onto a selected region or component of the valvetrain, such as the valve springs.

BRIEF DESCRIPTION OF THE DRAWINGS

The invention will be described with reference to the accompanying drawings wherein.

DETAILED DESCRIPTION OF A PREFERRED EMBODIMENT

Preferred embodiments of the present invention are described below with reference to the accompanying drawings, wherein like reference numerals refer to the same item.

Figure 1:
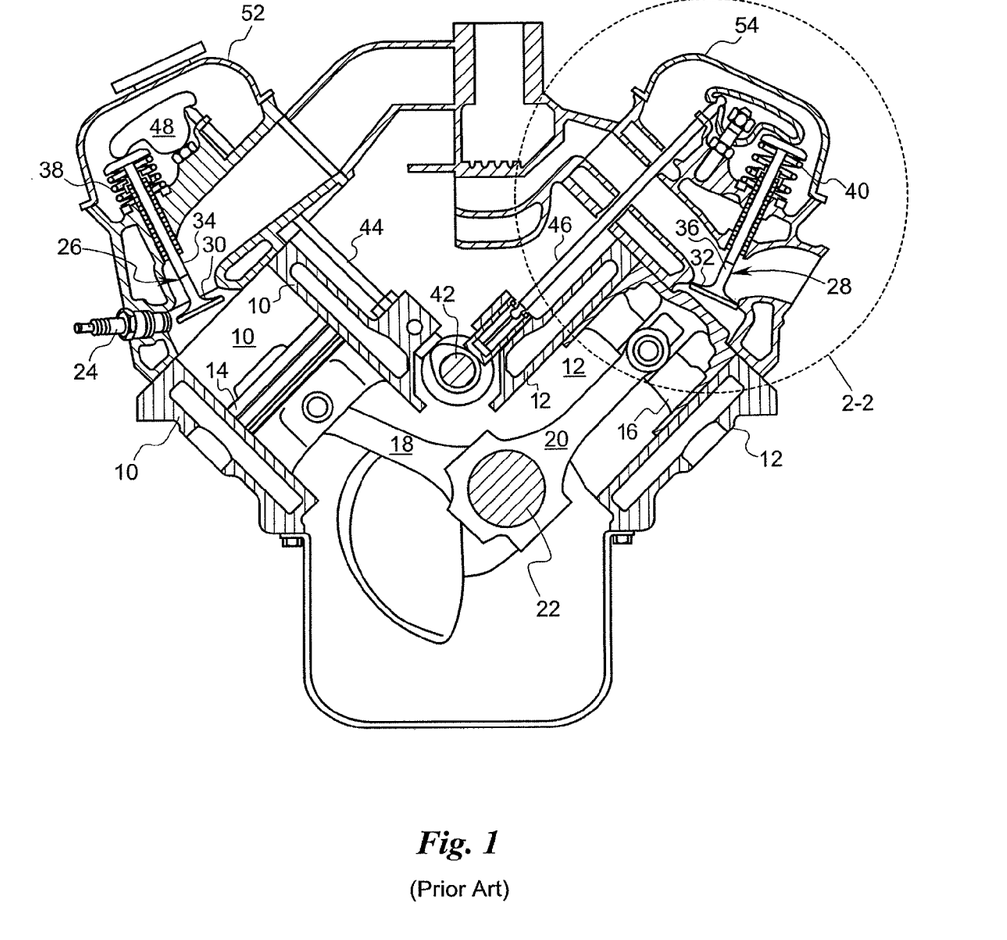
FIG. 1 is a schematic illustration, in partial cross-section, of an exemplary prior art internal combustion engine in connection with which the instant invention may be utilized.

There is shown in FIG. 1 a traditional reciprocating internal combustion engine in which pistons and cylinders are arranged in a "V" configuration relative to a central crankshaft. As will be appreciated from the following discussion, the present invention may be employed with a wide variety of other types of internal combustion engines, and the internal combustion engine shown in FIG. 1 is to be considered only an exemplary engine with which the instant invention may be advantageously used.

The internal combustion engine shown in FIG. 1 shows two cylinders 10, 12 oriented at an approximately ninety degree angle with respect to each other in what is known as a "V" configuration. Typically, such engines include six or eight cylinders, with 3 or 4 cylinders, respectively, in a row on each side of the "V". Each cylinder 10, 12 includes an associated piston 14, 16 adapted to translate within the associated cylinder 10, 12. The diameter of each piston 14, 16 is only slightly smaller than the diameter of the internal wall of each cylinder 10, 12, however, the periphery of the piston 14, 16 may be fitted with one or more rings to effectively provide a seal between the associated piston 14, 16 and the inner wall of the associated cylinder 10, 12.

Each piston 14, 16 is pivotably mounted on an end of an associated connecting rod or piston rod 18, 20. The other end of each connecting rod 18, 20 is pivotably coupled to a crankshaft 22, which provides driving rotational power to a wheel, propeller, or other object (not shown).

The upper portion of each cylinder 10, 12, on the side of the associated piston 14, 16 opposite to the connecting rod 18, 20, comprises a combustion chamber. Fuel, such as gasoline, and oxygen, which is usually in the form of ambient air, are admixed and introduced into the combustion chamber. In a so-called 4-cycle engine, the introduction of the fuel/oxygen mixture into the combustion chamber is the first cycle. In the second cycle, the piston 14, 20 moves upward in the associated cylinder 10, 12 to compress the fuel/air mixture within the combustion chamber. In the third cycle, the compressed fuel/air mixture is ignited, which may be initiated through a spark plug 24, shown in FIG. 1. The ignited fuel/oxygen mixture combusts whereby the combusted mixture forcefully expands, thereby pushing the piston 14, 16 forcefully downward and rotating the crankshaft 22. In the fourth cycle, the piston 14, 16 moves upward in the cylinder 10, 12 to push the exhausted gas up through the combustion chamber and into an exhaust manifold. The four cycles are then repeated.

The introduction of the fuel/oxygen mixture and the exiting of the exhausted gas from the combustion chamber are controlled by one or more valves. A valve must be open in order to introduce the fuel/air mixture, and normally a different valve must be open to permit exit of the exhausted gas, and both valves must be closed when the piston is moving upward and compressing the fuel/oxygen mixture and when the compressed mixture is ignited. As shown in FIG. 1, there are two so-called poppet type valves 26, 28. Each valve 26, 28 includes an associated valve head 30, 32 and an associated valve stem 34, 36. Each valve stem 34, 36 reciprocates within an associated sheath, and the distal end of each valve shaft 34, 36 is connected to a coil-type valve spring 38, 40 generally maintained in a force of extension.

The reciprocation of the valves 26, 28 against the bias of the associated springs 38, 40 is accomplished through a camshaft 42 that rotates in a synchronized relationship with the crankshaft 22 via timing chains, timing belts, and timing gears (not shown). The camshaft 42 acts against push rods 44, 46 such that the push rods 44, 46 reciprocate with the rotation of the camshaft 42. The ends of the push rods 44, 46 near the camshaft 42 abut against so-called lifters which in turn ride upon the surface of the camshaft 42. The end of each push rod 44, 46 disposed away from the camshaft 42 acts on the underside of one end of an associated rocker arm 48, 50 that pivots. The other end of each rocker arm 48, 50 acts on the end of an associated valve stem 34, 36. As will be appreciated from reviewing FIG. 1, the reciprocation of a push rod 44, 46 away from the camshaft 42 will rotate the associated rocker arm 48, 50 and push the associated valve stem 34, 36 downward, against the bias of the associated valve spring 38, 40, and thereby unseat and open the associated valve head 30, 32.

The engine further comprises conventional valve cover housings 52, 54 that are secured over the ends of the push rods 44, 46, the rocker arms 48, 50, the valve springs 38, 40, and the distal ends of the valve stems 34, 36.

In a broad sense, a so-called "valvetrain" is considered to be the mechanical system responsible for operation of the valves. In the foregoing described prior art engine, the valvetrain would normally be considered to include the valves 26, 28, the rocker arms 48, 50, the push rods 44, 46, the lifters, and the camshaft 42. Valvetrain components may include one or more of the various components forming the valvetrain.

It will be appreciated by those skilled in the art that internal combustion engines often employ valves other than those of a poppet type, such as sleeve, slide, and rotary valves.

It should also be appreciated that the invention has applicability to engines other than the above-described prior art engine, and may be used, for example, with overhead valve (OHV) engines, overhead cam (SOHC) engines, or double overhead cam (DOHC) engines.

As previously indicated, the present invention relates to a valve cover housing and a method of using that housing that helps reduce the temperature of certain components of the valvetrain, such as valve springs. By reducing the temperature of these valvetrain components, the valvetrain will have greater longevity, the chance of engine-damaging detonation will decrease, and operating efficiency will increase.

Figure 3:
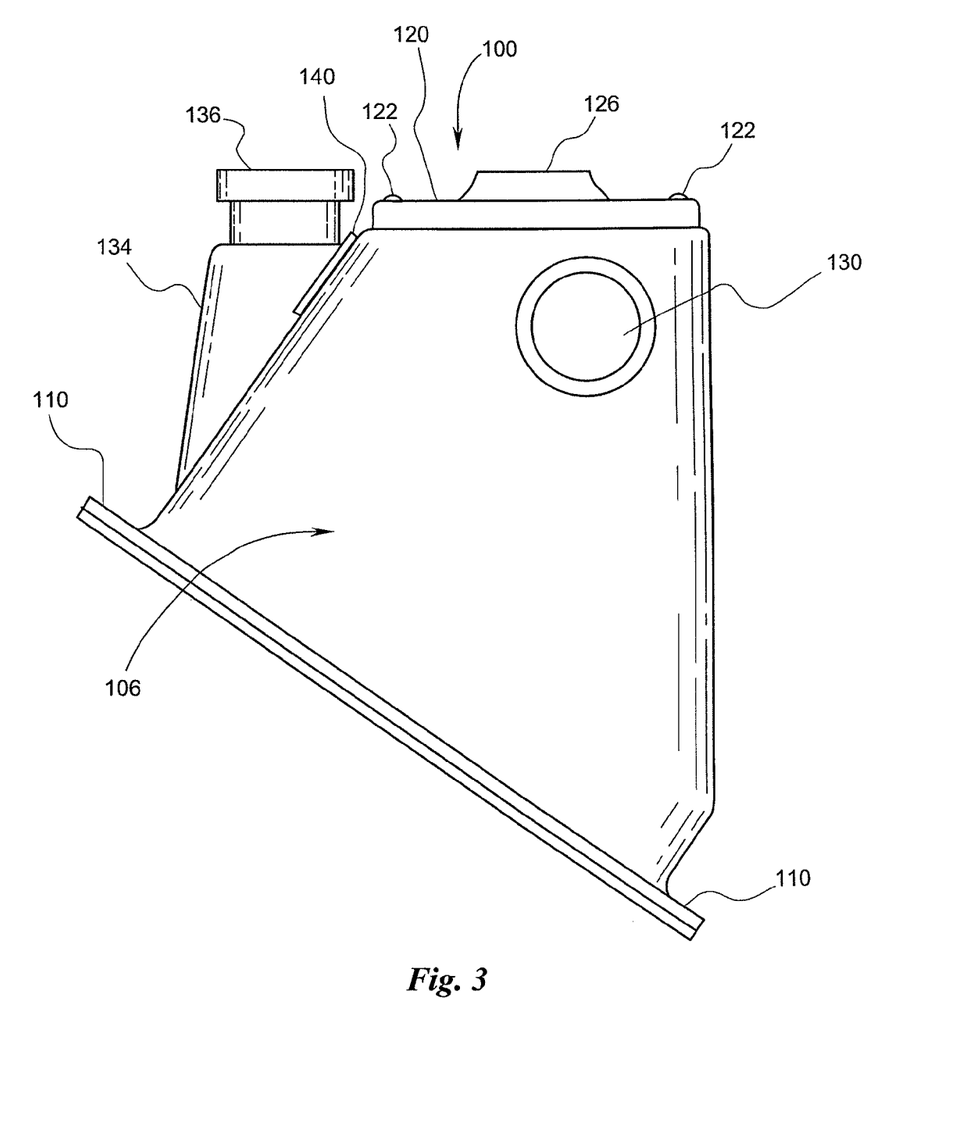
FIG. 3 is a plan, end view of the valve cover housing shown in FIG. 2.
Figure 4:
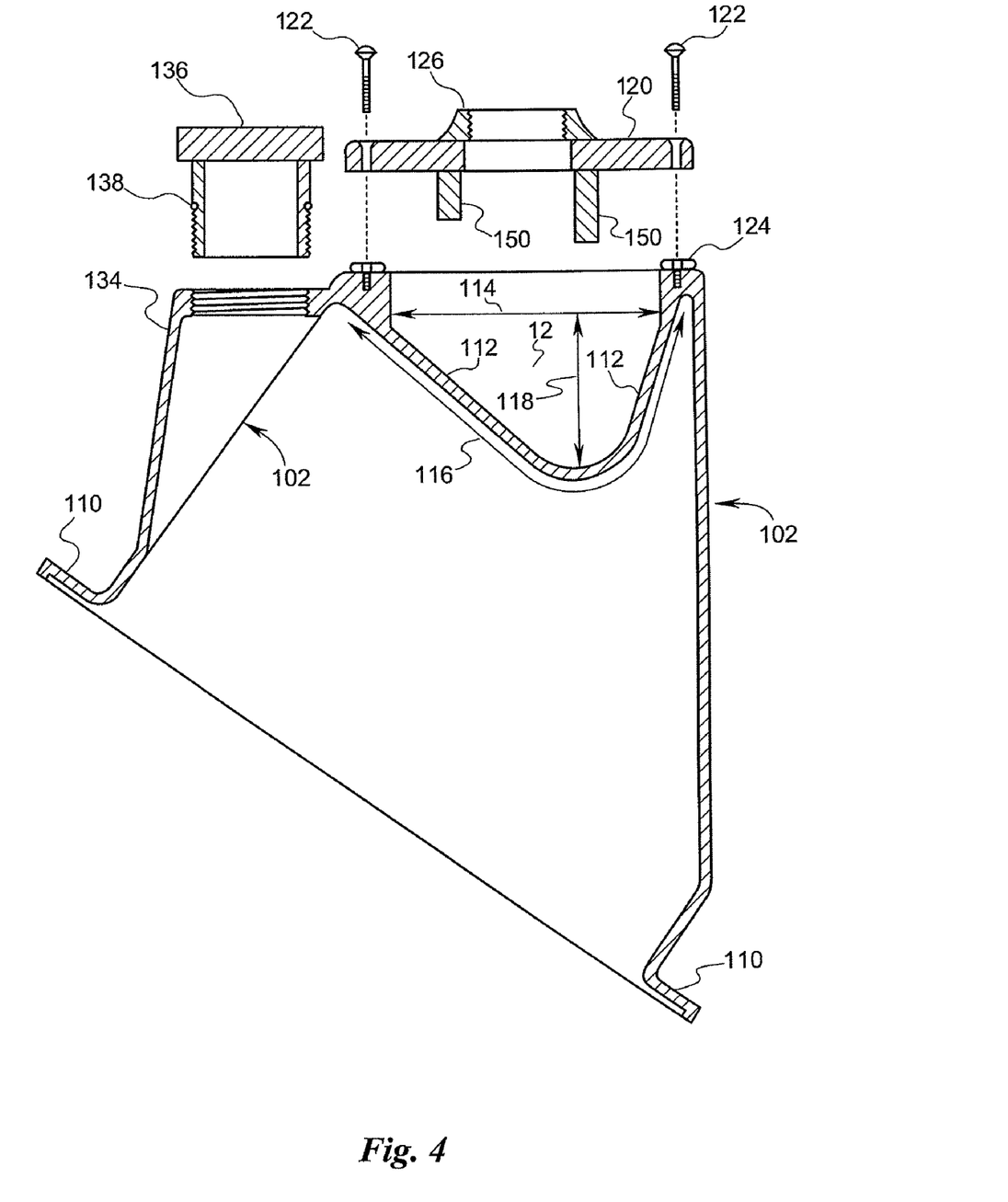
FIG. 4 is a partial cross-sectional, exploded view of the valve cover housing shown in FIGS. 2 and 3.
Figure 5:
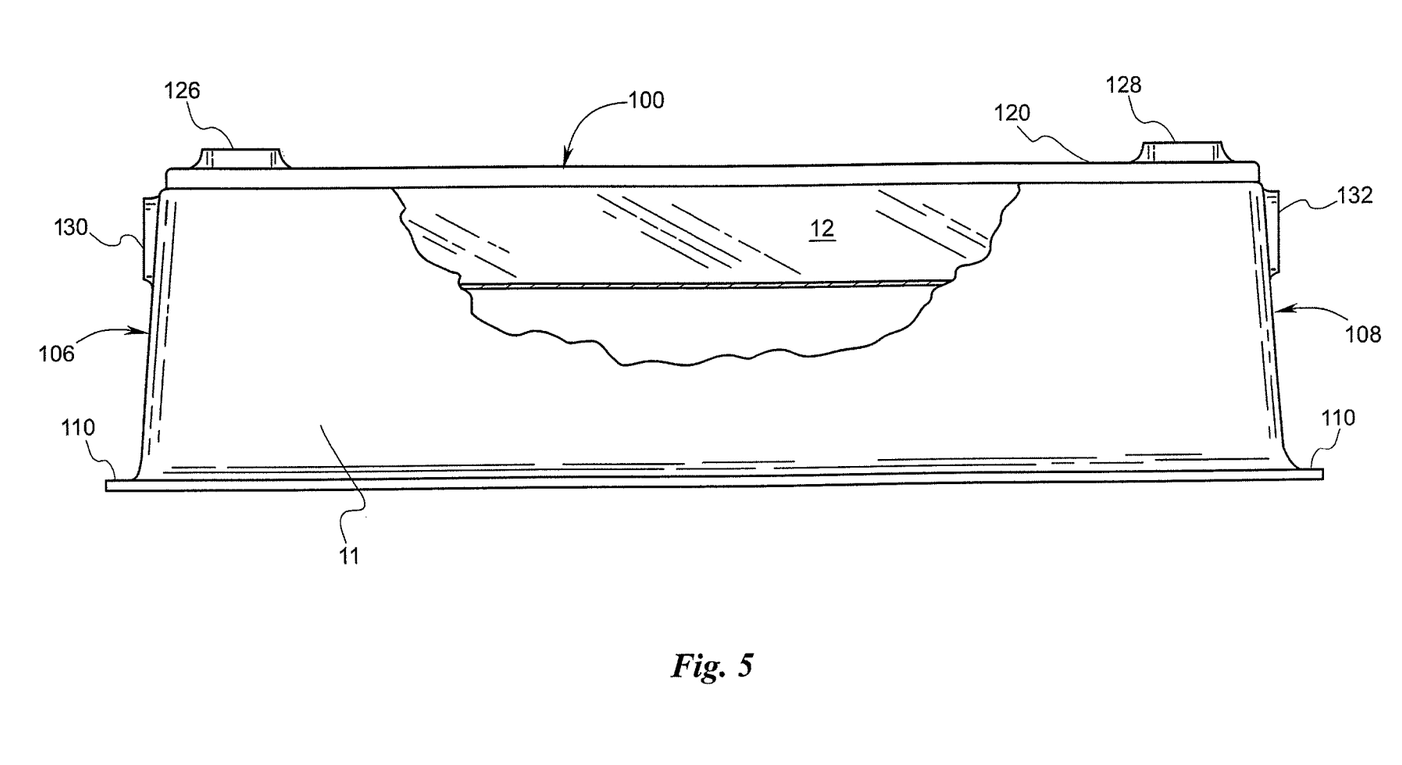
FIG. 5 is a plan, side view, in partial break-away, of the valve cover housing shown in FIGS. 2, 3, and 4.
Figure 6:
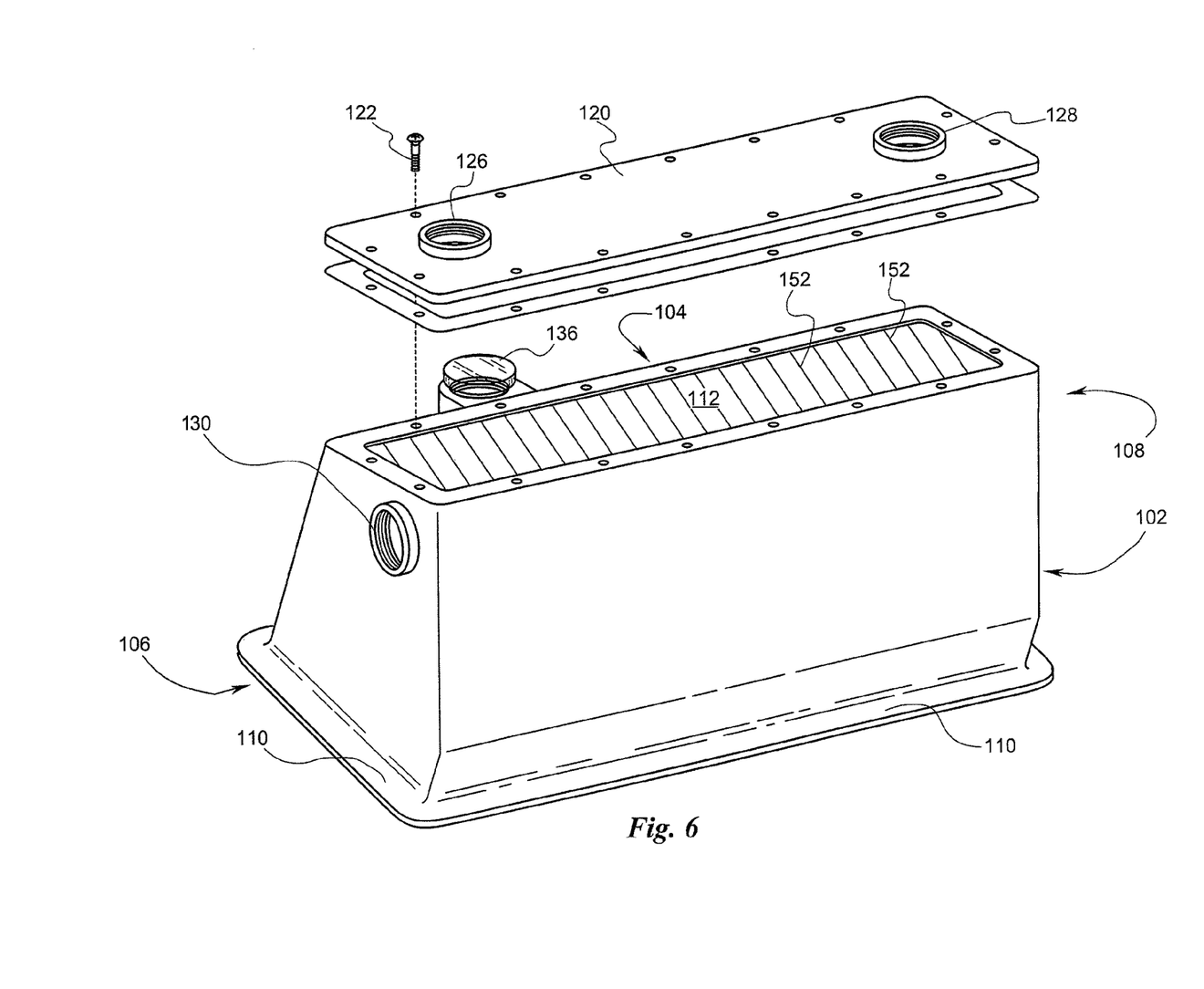
FIG. 6 is a top plan, exploded view of the valve cover housing shown in FIGS. 2-5.
Figure 7:
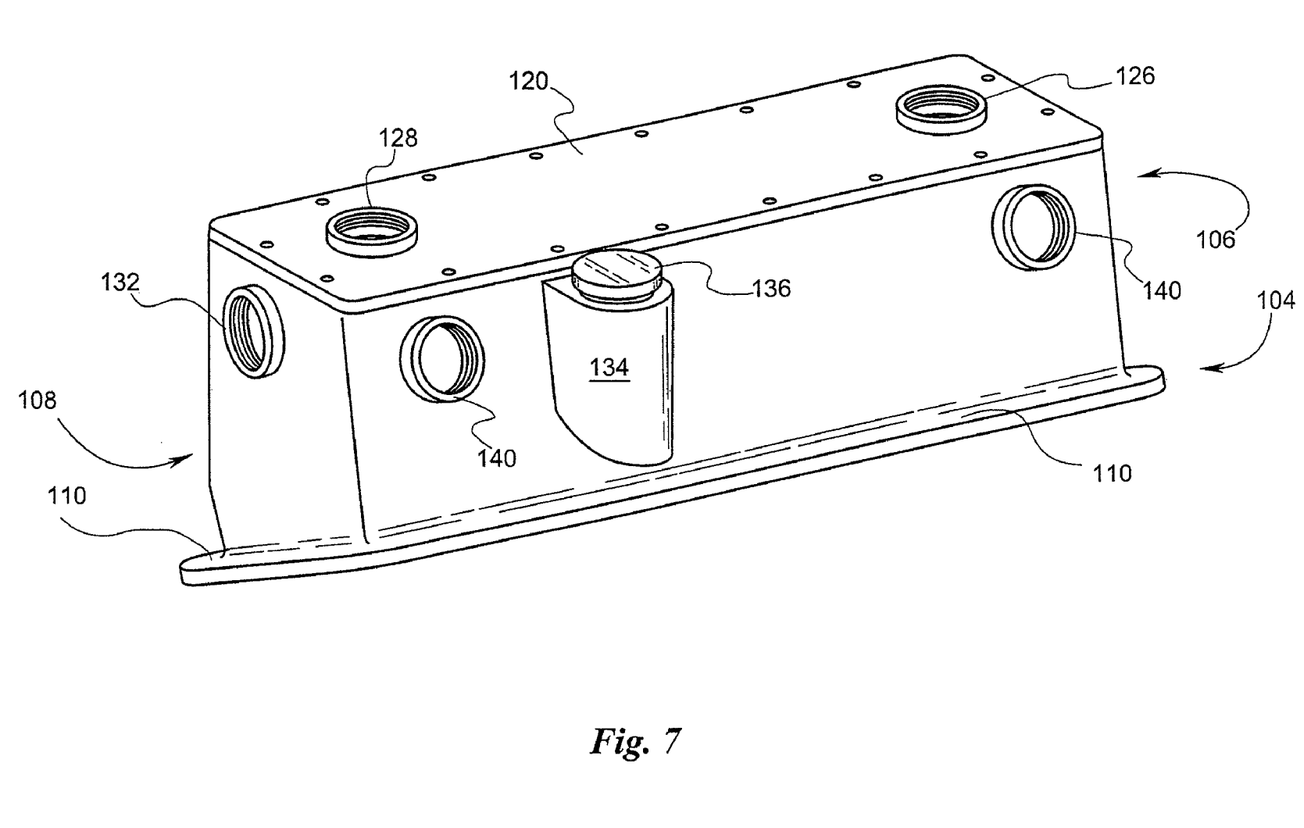
FIG. 7 is a top plan view of the valve cover housing shown in FIGS. 2-6.

There is shown in FIGS. 2-7 a valve cover housing in accordance with one preferred embodiment of the present invention. As best shown in FIGS. 5-7, the valve cover housing comprises an elongate body that may have a box-like structure including an upper side 100, a pair of lateral sides 102, 104, and a pair of opposing end sides 106, 108.

Figure 2:
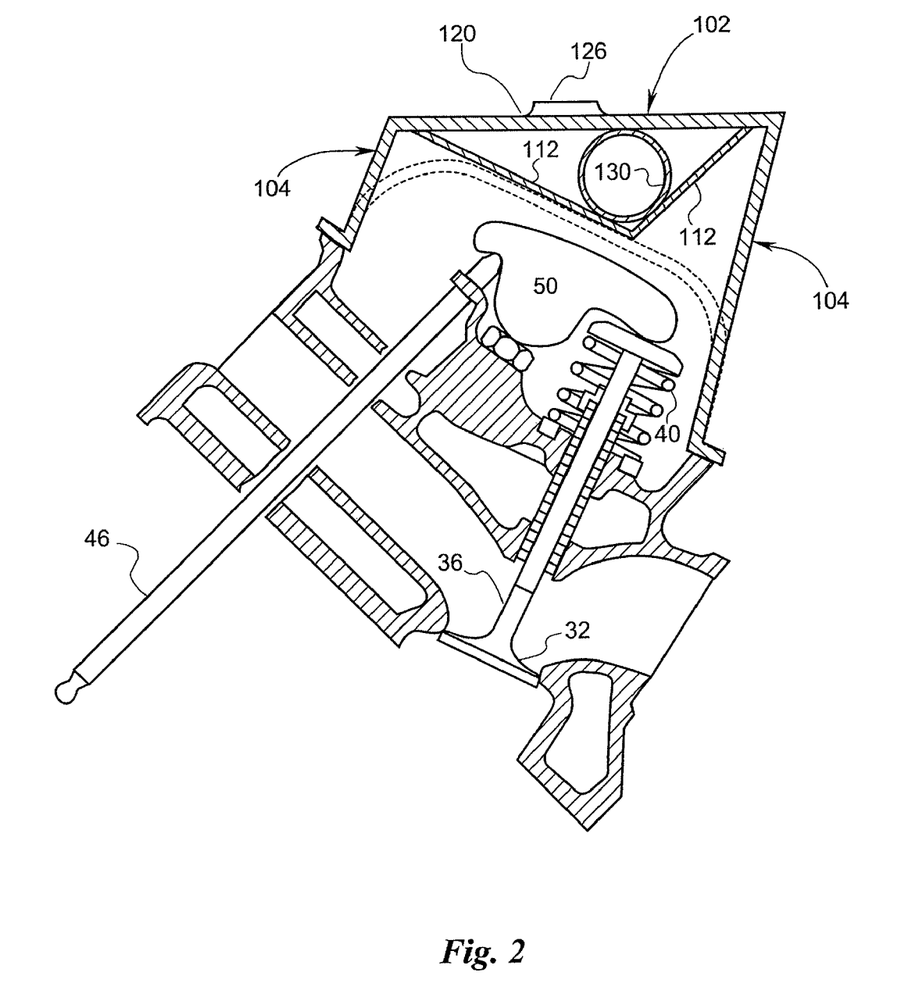
FIG. 2 is a schematic illustration of the region within the circle 2-2 shown in FIG. 1 in which a conventional valve cover housing is depicted in phantom lines and in which an embodiment of the valve cover housing in accordance with present invention is shown in partial cross-section.

As best shown in FIG. 4, the valve cover housing possesses a generally hollow interior and an open underside. As best shown in FIGS. 2-4, the peripheral edge of the valve cover housing in the region adjacent to the open underside possesses a flange 110 extending around the entire valve cover housing. The flange 110 is adapted to be mounted onto the engine through bolts or the like such that the housing covers and encompasses the upper end of the push rods 46, the rocker arms 50, the valve springs 40, and the valve stems 36 associated with the cylinders 12 along one side of the "V" configured engine. Again, the components of the valvetrain that are covered by the valve cover housing may vary, especially with different valve designs or different internal combustion engine designs. The flange 110 of the valve cover housing should be mounted in a fluid-tight seal, and for this purpose, a rubber gasket (not shown) or O-ring (not shown) configured in the shape of the flange 110 may be disposed beneath the flange 110.

The valve cover housing also includes a trough 112 extending substantially from one longitudinal end to the other longitudinal end of the elongate body. As best shown in FIGS. 2, 4, and 6, the trough 112 is fashioned in a generally convex shape, with a bulge protruding downwardly toward the valvetrain components, when the valve cover housing is installed on the engine. In the context of the present invention, the term "convex" includes, but is not limited to, arcuate portions of a circle and may include other curves, "V" shapes, and other shaped bulges or protuberances, and may either possess symmetry or may be asymmetrical. In a preferred embodiment, the thickness of the trough 112 is substantially uniform, however, it is contemplated that the trough 112 may have a non-uniform thickness. The configuration of the upper surface of the trough 112 may be the same as, or may be different from, the lower surface of the trough 112. Preferably, both the upper surface and the lower surface of the trough 112 provide a relatively large surface area.

The trough 112 may be sealingly joined to the inner walls of the elongate body either by being integrally formed with the body or by being secured through welding, bolts and gaskets, epoxy, or the like to the body. In a preferred embodiment, the trough 112, the side walls 102, 104, and the end walls 106, 108 of the body are formed of a unitary piece of metal formed through a die-casting method. It should be appreciated that the structure could also be fabricated using a sand or plaster cast or could be manufactured from carbon fiber, for example. Preferably, the trough 112 is fashioned of a material that readily transfers heat.

The profile of the trough 112 also possesses other characteristics. For example, the ratio of the distance between the lateral edges of the trough 112, indicated by the double-arrowed line 114 in FIG. 4 to the distance along the lower peripheral surface of the trough 112 from one lateral edge to the other lateral edge, as indicated by the double-arrowed line 116 in FIG. 4 is no more than about 0.80, and preferably the ratio is in the range of about 0.75 to 0.25. Similarly, the ratio of the lateral width 114 of the trough 112 to the maximum depth of the convexity of the trough 112 indicated by the double-arrowed line 118 in FIG. 4 is no more than about 3.0 and preferably the ratio is in the range of about 1.5 to 2.5. The valve cover housing also preferably includes a removable cap or panel 120 for disposition above the trough 112. The panel 120 may be releasably secured to the body by means of a plurality of screws or bolts 122, as best shown in FIGS. 4 and 6. The panel 120 is preferably joined to the body in a fluid-tight fit, for which a gasket 124 may be employed, as shown in FIG. 4. It should be appreciated that the panel 120 may be integrally formed with other components of the body or may be permanently affixed to the other portions of the body such as by welding.

The panel 120 includes a pair of ports 126, 128 extending therethrough near the longitudinal ends thereof. The end walls 106, 108 may also include associated ports 130, 132 in communication with the trough 112.

As best shown in FIGS. 3, 4, and 7, the valve cover housing also includes an upstanding inlet 134 mounted on one lateral side 104 of the body to provide access to the hollow interior of the body, beneath the trough 112. The inlet 134 possesses a threaded opening adapted to receive a threaded oil filler plug 136. As shown in FIG. 4, the filler cap 136 may include an O-ring seal 138.

One lateral side of 104 of the body may also be provided with a pair of ports 140 that have threaded surfaces adapted to receive breather hoses.

The ports 126, 128, 130 and 132 are adapted to receive the ends of tubes in fluid communication with a coolant fluid, the source of which might be, for example, radiator coolant fluid, or in the case of boat or marine engines, fresh water or sea water. The coolant fluid is preferably pressurized by means of a pump or the like so that the coolant fluid may pass relatively quickly through the trough 112. In a preferred embodiment, there are potentially four different flow paths for the coolant fluid through the trough 112. The fluid may flow between ports 130 and 132, through ports 126 and 128, through ports 130 and 128, and through ports 126 and 132. Whatever pair of ports is not used may be plugged. As will best be appreciated with reference to FIG. 5, the ports are arranged so that the coolant fluid may flow through essentially the entire length of the trough 112.

When the valve cover housing of the preferred embodiment is disposed over certain components of the valvetrain, as best shown in FIG. 2, the oil or another lubricant splatters within the lower, hollow cavity of the body due to the action of the valvetrain components. The peripheral contour of the trough 112 is very preferably designed so as to provide a large surface area on which the oil may splatter and to provide the most efficient heat transfer to the coolant fluid flowing in the trough 112. Also, the peripheral contour of the trough 112 is very preferably designed so that the oil splattered thereon will flow downwardly against the peripheral surface of the trough 112, thereby further enhancing the transfer of heat from the oil to the coolant fluid and so that the oil will drip from the trough 112 downwardly and onto the valve spring 40 or some other desired, selected component of the valvetrain. Thus, the trough 112 not only helps maximize heat transfer from the oil to the coolant fluid, but also helps redirect the cooled oil onto a region of the valvetrain that most needs the cooled oil to be deposited thereon.

The valve cover housing may also be fitted with a bung (not shown) through which a temperature probe may be inserted in order to monitor the temperature of the hollow interior beneath the trough 112. The temperature so monitored may be used to regulate the flow of coolant fluid through the trough 112. Preferably the temperature probe is disposed near the trough 112.

Figure 8:
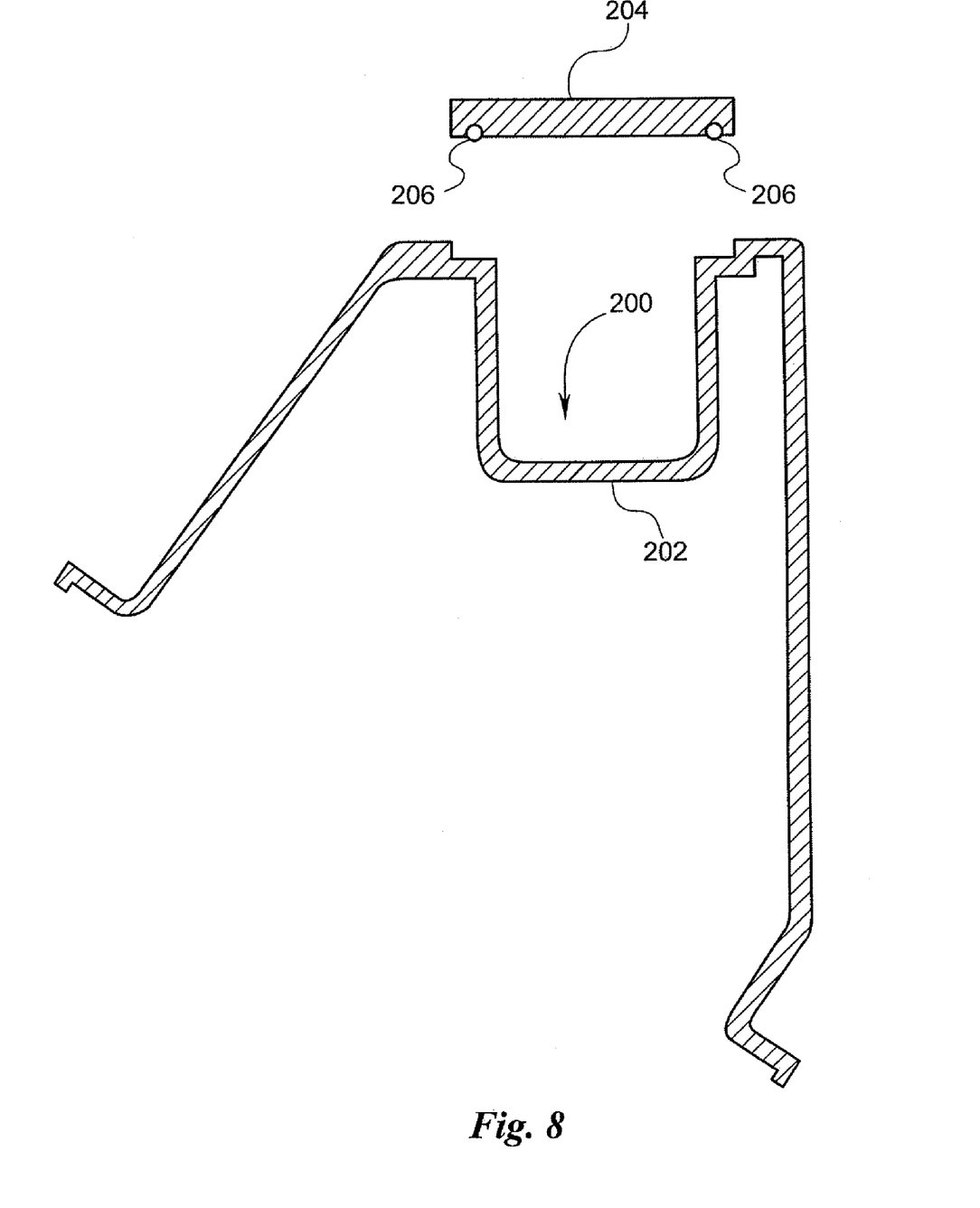
FIG. 8 is a partial cross-sectional, exploded view of another embodiment of the valve cover housing in accordance with the present invention.

There is shown in FIG. 8 a valve cover housing in accordance with yet a slightly different embodiment of the present invention. The valve cover housing is in all material respects the same as that described with reference to FIGS. 2-7, however, the configuration of the trough 200 in FIG. 8 is slightly different from the trough 112 in the embodiment described with reference to FIGS. 2-7. It will be appreciated from reviewing FIG. 8, the trough 200 possesses a "U" configuration in cross-section. Preferably both the internal and the external surface corners of the trough 200 are rounded. It will be appreciated that when installed as shown in FIG. 2, the external surface edge designated by the numeral 202 of the trough 200 will be disposed downward relative to the other portions of the trough 200. As such, lubricant splattering on the external surface of the trough 200 will flow toward the external surface edge 202 and drip downwardly from that corner, again, preferably onto a selected region or component of the valvetrain. Like the panel 120 with regard to reference to FIGS. 2-7, the embodiment shown in FIG. 8 may also include a panel 204 adapted to be releasably secured by bolts or the like immediately above the trough 200. Panel 204 may include a circumferential groove on the bottom surface thereof adapted to receive an O-ring 206 in order to provide a fluid-tight seal above the trough 200.

Figure 9:
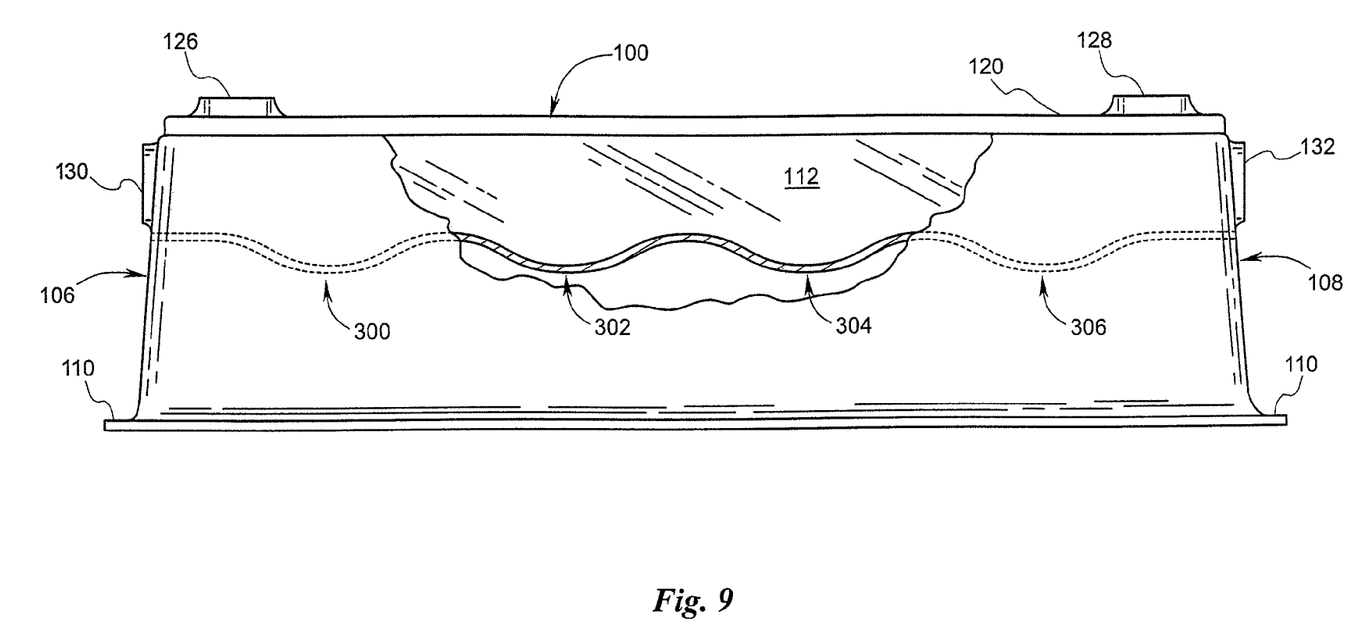
FIG. 9 is a plan, side view, in partial break-away of another embodiment of a valve cover housing in accordance with the present invention.

As shown in FIGS. 4 and 8, the trough 112 may possess a generally "V"-shape or "U"-shape lateral cross-section configuration, respectively. Oil splattering on the underside of the trough flows to the lowest point of the trough 112 and then drips onto the valvetrain component disposed below that lowest point. As shown in the embodiment depicted in FIG. 9, the trough 112 may alternatively or additionally possess an undulating configuration longitudinally. The lowest point of each undulation may be disposed over a selected valvetrain component, such as an exhaust valve spring. Although FIG. 9 depicts four evenly spaced, regular undulations, it should be appreciated that the invention contemplates any number of undulations, of any depth, of irregular depths, of uneven spacing, and of different contours.

While the trough 112 provides a relatively straight, smooth passageway for the coolant fluid, the invention contemplates that posts, baffles 150 and the like may be provided on the upper surface of the trough or on the lower surface of the panel 120 so as to create vortices and other turbulence within the coolant fluid so that any layer of coolant fluid near the upper surface of the trough 112 is disrupted, thereby refreshing such layer with fresh, relatively cool fluid and further enhancing heat transfer from the trough 112 to the coolant fluid. Either the upper surface, the lower surface, or both of the trough 112 may be fashioned with dimples, ridges 152 (as shown in FIG. 6), or other irregularities that provide a greater surface area for heat transfer and, in the case of the upper surface, enhance coolant fluid turbulence within the trough 112. Preferably such surface irregularities are arranged in a regular pattern. Alternatively, or additionally, the trough 112 or the bottom of the panel 120, or both, may include serpentine channels that redirect coolant fluid in the trough 112.

While the invention has been explained with reference to the foregoing description of a preferred embodiment, it should be appreciated that such explanation and description is exemplary, and is not to be considered as being restrictive or limiting. A vast number of variations within the scope of the invention may exist, and the foregoing description provides those skilled in the art with a foundation for implementing other exemplary embodiments of the invention.

I claim:

1. A valve cover housing adapted to be mounted over components of a valvetrain including valve springs of an internal combustion engine and adapted to contain a fluid lubricant that coats the valvetrain components, said valve cover housing comprising:
    a box body including an upper side, a pair of lateral sides, a pair of opposing end sides, and an open bottom, the peripheral edge of said box body along the open bottom adapted to be sealingly secured onto the engine in the region around the valvetrain components; and
    a trough extending in said box body substantially from one end side to the other end side and sealingly joined to the inner surface of said box body, said trough possessing means for directing the lubricant substantially onto the valve springs when said box body is so sealingly secured onto the engine.

2. A valve cover housing according to claim 1 wherein said box body further includes means for permitting a coolant fluid to pass through said trough.

3. A valve cover housing according to claim 2 where said trough possesses a pair of opposing, substantially parallel, lateral edges, a substantially uniform thickness and a substantially convex shape in lateral cross-section and wherein the ratio of (1) the distance between said lateral edges of said trough to (2) the distance along the lower peripheral surface of said trough from one lateral edge to the other lateral edge is no more than about 0.80.

4. A valve cover housing according to claim 3 wherein said ratio is in the range of about 0.75 to 0.25.

5. A valve cover housing according to claim 2 further including means for creating turbulence in the coolant fluid as the coolant fluid passes through said trough.

6. A valve cover housing according to claim 1 wherein said box body further includes means for attaching breather hoses to said box body whereby said breather hoses are disposed in fluid communication with the interior of said box body and with said fluid lubricant when said box body is so sealingly secured onto the engine and said box body further includes a closure adapted to permit the pouring of the lubricant into the interior of said box body and onto the valvetrain components when said box body is so sealingly secured onto the engine.

7. A valve cover housing according to claim 1 wherein lubricant directing means includes a substantially "V"-shaped exterior surface in said trough, which "V"-shaped exterior surface extends substantially the entire length of said trough from one end side to the other end side of said box body.

8. A valve cover housing according to claim 7 where said trough possesses a pair of opposing, substantially parallel, lateral edges, a substantially uniform thickness and a substantially "V"-shaped lateral cross-section and wherein the ratio of (1) the distance between said lateral edges of said trough to (2) the distance along the lower peripheral surface of said trough from one lateral edge to the other lateral edge is no more than about 0.80.

9. A valve cover housing according to claim 8 wherein said ratio is in the range of about 0.75 to 0.25.

10. A valve cover housing according to claim 1 wherein said upper side includes a removable panel adapted to permit access to said trough.

11. A valve cover housing according to claim 1 wherein said trough possesses a pattern of surface irregularities to provide a greater surface area for heat transfer.

12. A valve cover adapted to be mounted over components of a valvetrain of an internal combustion engine and adapted to contain a fluid lubricant that coats the valvetrain components, said valve cover comprising:
    an elongate body including an open side having a peripheral edge adapted to be sealingly secured onto the engine in the region around the valvetrain components; and
    a partition extending substantially along the length of and within said elongate body and sealingly joined to the surface of said elongate body whereby said panel segregates the interior of said elongate body into an upper cavity and a lower cavity, said upper cavity adapted to receive and transmit a coolant fluid, said lower cavity adapted to receive the lubricant, both the upper surface and the lower surface of said partition being substantially convex whereby said partition provides a relatively large surface area adapted to be exposed to the coolant fluid and a relatively large surface area adapted to be exposed to the lubricant and whereby heat from the lubricant is relatively effectively transmitted through said partition to the coolant fluid.

13. A valve cover housing according to claim 12 wherein said partition lower surface possesses a substantially convex shape in lateral cross-section and wherein the ratio of (1) the lateral width of said partition outer surface to (2) the maximum depth of the convexity of said partition outer surface is no more than about 3.0.

14. A valve cover housing according to claim 13 wherein said ratio is in the range of about 1.5 to 2.5.

15. A valve cover housing according to claim 12 wherein both the inner surface and the outer surface of said partition are substantially convex, but substantially non-circular.

16. A valve cover housing according to claim 12 wherein said partition possesses a pattern of surface irregularities to provide a greater surface area for heat transfer.

17. A valve cover housing according to claim 12 further including means for creating turbulence in the coolant fluid as the coolant fluid passes through said partition.

18. A valve cover housing adapted to be mounted over valvetrain components of an internal combustion engine and adapted to contain a fluid lubricant that coats the valvetrain components, said valve cover housing comprising:
    an elongate, substantially hollow casing adapted to be sealingly secured onto the engine in region around the valvetrain components; and
    a conduit disposed within said elongate, substantially hollow casing and adapted to receive and transmit a coolant fluid, said conduit possessing means for directing the lubricant substantially onto selected valvetrain components when said elongate, substantially hollow casing is so sealingly secured onto the engine.

19. A valve cover housing according to claim 18 wherein said conduit extends substantially from one elongate end to the other elongate end of said elongate, substantially hollow casing.

20. A valve cover housing according to claim 19 wherein said conduit provides a substantially straight pathway for transmitting the coolant fluid.

21. A valve cover housing according to claim 19 wherein said conduit provides a substantially serpentine pathway for transmitting the coolant fluid.

22. A valve cover housing according to claim 18 wherein said conduit possesses a pattern of surface irregularities to provide a greater surface area for heat transfer.

23. A valve cover housing according to claim 18 further including means for creating turbulence in the coolant fluid as the coolant fluid passes through said conduit.

24. A method of reducing the temperature of a selected region of an internal combustion engine containing valvetrain components, said method comprising:
- obtaining an elongate, substantially hollow covering including a conduit adapted to receive and transmit a coolant fluid and including means for directing a lubricant substantially onto said selected region;
- installing said covering onto said engine such that said covering completely, sealingly surrounds said selected region;
- introducing the lubricant into said selected region;
- operating said engine; and
- transmitting coolant fluid through said conduit.

25. A method of reducing the temperature of a selected region of an internal combustion engine containing valvetrain components, said method comprising:
- obtaining an elongate, substantially hollow covering including a conduit adapted to receive and transmit a coolant fluid and possessing an exterior surface adapted to contact a lubricant that coats said components, said exterior surface possessing a bulge;
- installing said covering onto said engine such that said covering completely surrounds said selected region and such that said exterior surface bulge is oriented above said selected region;
- introducing the lubricant into said selected region; and
- transmitting coolant fluid through said conduit.

26. A method of reducing the temperature of a selected region of an internal combustion engine containing valvetrain components, said method comprising:
- obtaining an elongate, substantially hollow covering possessing a cavity and possessing means for directing a lubricant splattered within the cavity substantially onto said selected region;
- installing said covering onto said engine such that said covering completely surrounds said region;
- introducing the lubricant into said cavity; and
- splattering the lubricant in said cavity whereby said splattered lubricant is directed by said lubricant directing means onto said selected region.

* * * * *